United States Patent [19]

Katayama et al.

[11] Patent Number: 4,964,792
[45] Date of Patent: Oct. 23, 1990

[54] UPPER METAL MOLD CLAMP DEVICE IN A TIRE VULCANIZING MACHINE

[75] Inventors: Hideaki Katayama; Toshifumi Murakami, both of Nagasaki; Koji Soeda, Kobe; Yoshiya Kubota; Shoji Okamoto, both of Toyota; Akinori Kubota, Kobe; Michihito Kobayashi, Toyota; Masaaki Ijiri, Aichi, all of Japan

[73] Assignees: Mitsubishi Jukogyo Kabushiki Kaisha, Tokyo; Sumitomo Rubber Industries Ltd., Hyogo, both of Japan

[21] Appl. No.: 433,778

[22] Filed: Nov. 9, 1989

[30] Foreign Application Priority Data

Nov. 11, 1988 [JP] Japan ................. 63-283800

[51] Int. Cl.⁵ .............. B29C 33/02; B29C 33/26
[52] U.S. Cl. .............................. 425/32; 425/40; 425/47; 425/195; 425/450.1; 425/451.9
[58] Field of Search .............. 425/47, 32, 35, 182, 425/193, 195, 450.1, 451.4, 40, 451.9, 595

[56] References Cited

U.S. PATENT DOCUMENTS

| | | | |
|---|---|---|---|
| 3,730,658 | 5/1973 | Marra | 425/47 |
| 4,453,902 | 6/1984 | Imbert | 425/47 |
| 4,484,875 | 11/1984 | Irie et al. | 425/47 |
| 4,580,959 | 4/1986 | Pissorno et al. | 425/47 |
| 4,601,648 | 7/1986 | Amano et al. | 425/47 |
| 4,631,014 | 12/1986 | Drewel et al. | 425/47 |
| 4,686,129 | 8/1987 | Yokoyama et al. | 425/47 |

Primary Examiner—Willard Hoag
Attorney, Agent, or Firm—Wenderoth, Lind & Ponack

[57] ABSTRACT

An upper metal mold clamp device in a tire vulcanizing machine of the type that an upper metal mold is detachably fixed to a bolster by rotating clamp rods vertically penetrating through the bolster and provided with clamp claws at their bottom ends, is improved. Drive units rotate the respective clamp rods independently of rotation of the other clamp rods. Nuts are mounted onto the bolster plate in an unrotatable but vertically movable manner, and threadedly engaged with male screws at the upper portions of the clamp rods. Hollow spaces for accommodating the clamp claws are formed around the clamp rods on the bottom surface of an upper heat plate held in contact with the upper metal mold.

8 Claims, 7 Drawing Sheets

UPPER METAL MOLD CLAMP DEVICE IN A TIRE VULCANIZING MACHINE

BACKGROUND OF THE INVENTION:

1. Field of the Invention:

The present invention relates to a device for automatically mounting and dismounting an upper metal mold to and from a bolster plate and an upper heat plate upon exchange of metal molds when a size and a kind of a tire to be vulcanized are changed in a tire vulcanizing machine.

2. Description of the Prior Art:

In a tire vulcanizing machine, metal molds for vulcanization respectively have different configurations for respective kinds and respective sizes of tires and depending upon a tire production schedule, it is necessary to perform exchange works for metal molds fairly frequently.

An upper metal mold and a lower metal mold were fixed to an upper heat plate and a lower heat plate, respectively, by fastening bolts in the prior art. Since the metal mold exchange work necessitates a long period of time, in recent years plans for improvements thereof have been proposed. One of the proposals is the invention disclosed in Japanese Patent Application No. 60-037704 (1985), and this invention will be described with reference to FIGS. 5 to 9.

In FIGS. 5 to 9, with regard to a metal mold mount portion within a tire vulcanizing machine, in relation to a lower metal mold, on a vulcanizing machine frame 1 a thermal insulator 2 and a lower heat plate 3 are fixedly fastened to the frame by means of bolts 4.

In relation to an upper metal mold, preliminarily a thermal insulator 6 and an upper heat plate 7 are fixedly fastened integrally to a lower surface of a bolster plate 5 by means of bolts 8. The bolster plate 5 is exactly raised and lowered within a frame by means of an elevator and guide means not shown.

Clamp rod 9 is preliminarily assembled as penetrating through holes in the bolster plate 5, the thermal insulator 6 and the upper heat plate 7. At the bottom end of the clamp rod 9 is formed a clamp claw 10, and its top end is fitted to a rotating lever 13 via a key 14. At the middle of a shaft of the clamp rod 9 is mounted a sprocket 11 via a key 12. Furthermore, on the middle portion of the clamp rod 9 is formed a male screw 15, and this male screw 15 is threadedly engaged with a nut 16 which is fixed to the bolster plate 5 by means of bolts 30. Bearings 17 and 18 support the clamp rod 9.

The clamp rods 9 are assembled at four locations at equal intervals on the plane of the bolster plate 5, the respective sprockets 11 are interlocked via a roller chain 19, and thereby rotational drive for the clamp rods 9 is simultaneously transmitted to the clamp rods 9 at four locations.

A sprocket 20 is an idler sprocket for preventing the roller chain 19 from loosening.

Actuation of a cylinder 21 rotationally drives the clamp rod 9 via the lever 13 and the key 14.

A clamp metal 22, a link 23, a lever 24 and a cylinder 25 are used for clamping a lower metal mold 26 and a lower heat plate 3.

A clamp assistant plate 28 is preliminarily fastened to a top surface of an upper metal mold 27 by means of bolts 29, and thus the upper metal mold 27 and the clamp assistant plate 28 are carried into a vulcanizing machine in an integrated state.

When a metal mold is carried into a vulcanizing machine, at first the bolster plate 5, the thermal insulator 6 and the upper heat plate 7 are integrally raised up to the upper limit to broaden a carry-in space for the metal mold, and then, the upper and lower metal molds 26 and 27 and the clamp assistant plate 28 are made to sit at a regular position in the vulcanizing machine 3 by means of a conveying instrument such as a fork-lift or the like. Next, the bolster plate 5 is lowered to bring the upper heat plate 7 into tight contact with the clamp assistant plate 28. At this moment, the clamp claw 10 must be accommodated in the bore of the clamp assistant plate 28 at the position shown in FIG. 8. Then, by actuating the cylinder 25, the clamp metal 22 is meshed with a slot 31 in the lower metal mold 26, and thereby the lower heat plate and the slot 31 are clamped.

Subsequently, the cylinder 21 is actuated to rotate the clamp rod 9, hence the clamp claw 10 is rotated by about 90° as shown in FIG. 9, and the upper heat plate 7 and the clamp assistant plate 28 are clamped. When the clamp rod 9 rotates, the clamp rod 9 is raised by the screw 15, and the upper heat plate 7 and the clamp assistant plate 28 are firmly held in tight contact.

However, the above-described upper metal mold clamp device had the following shortcomings:

(1) In the above-mentioned device, four clamp rods (screw rods) and claws are rotated via a chain by means of a single hydraulic cylinder and thereby an upper metal mold is raised. Accordingly, the rotational angle and the raised height of the screw rod are constant for the four screw rod, and so, there is a shortcoming that if one of the four screw rods should unexpectedly finish to fasten earlier than the others. then the remaining three would become unable to fasten further.

(2) In addition, there is a shortcoming that in the case where before mounting of the upper metal mold the clamp claw should not be well inserted into the clamp bore of the clamp assistant plate but should strike against the top surface of the clamp assistant plate, due to lack of the accommodation means for the clamp claw the weight of the upper heat plate, the bolster plate and the like would be loaded upon the clamp claw, and the claw would be damaged.

(3) Furthermore, since lock means after finishment of clamping of the upper metal mold is not provided, there was a fear that during a work, clamping may loosen and the upper metal mold may fall.

SUMMARY OF THE INVENTION:

It is therefore one object of the present invention to provide an upper metal mold clamp device which is free from the above-described shortcomings (1) to (3) above in the prior art, and which can quickly and reliably carry out exchange of an upper metal mold.

According to one feature of the present invention, there is provided an upper metal mold clamp device in a tire vulcanizing machine of the type that an upper metal mold is detachably fixed to a bolster by rotating a plurality of clamp rods vertically penetrating through the bolster and provided with clamp claws at their bottom end, which clamp device comprises drive units such as hydraulic cylinders for rotating the respective clamp rods independently of rotation of the other clamp rods, nuts mounted onto the bolster plate in an unrotatable but vertically movable manner and threadedly engaged with male screws at the upper portions of the clamp rods, and clamp claw accommodating spaces formed around the clamp rods on the bottom surface of an upper heat plate held in contact with the upper metal mold.

According to a more specific feature of the present invention, the subject upper metal mold clamp device comprises a plurality of clamp rods penetrating vertically through a bolster plate and an upper heat plate, drive units such as hydraulic cylinders or the like connected to the top ends of the clamp rods via horizontal levers to apply torques to the clamp rods, clamp claws projected horizontally from the bottom ends of the clamp rods and adapted to be fitted in and disengaged from clamp slots in the upper metal mold, male screws threaded at middle positions of the clamp rods, nuts threadedly engaged with the male screws and mounted onto the bolster plate in an unrotatable but vertically movable manner, spaces machined in the upper heat plate for accommodating the clamp claws, and springs interposed between the clamp rods and the bolster plate for biasing the clamp rods downwards.

In operation of the metal mold clamp device according to the present invention, upper and lower metal molds are carried into a tire vulcanizing machine by means of a conveying instrument such as a fork-lift or the like, and they are made to sit at a regular position on a lower heat plate. Under this condition, the clamp claws are inserted into the clamp slots in the upper metal mold.

Subsequently, when the drive units for the clamp rods are actuated, for instance, by feeding pressurized fluid to hydraulic cylinders, the clamp rods are rotated and the clamp claws fit in the clamp slots. In addition, during the rotation, the clamp rods would move upwards as a result of threaded engagement between the male screws and the female screws, and the upper metal mold is pulled towards the upper heat plate and fastened thereto. When the clamp rod has rotated up to a predetermined angular position, a lock pin operates, and thereby rotation of the clamp rod is locked.

It is to be noted that during lowering of the bolster plate, when the clamp claw does not well align with the clamp slot in the upper metal mold but strikes against the top surface of the metal mold, the spring biasing the clamp rod downwards would contract and the clamp rod is pushed up, so that the clamp claw is drawn into the clamp claw accommodating space provided in the upper heat plate. As a result, damage of the clamp claw can be prevented. It is also to be noted that in association with the upward movement of the clamp rod, the male screw member and the drive unit for the clamp rod are also raised jointly.

The above-mentioned and other objects, features and advantages of the present invention will become more apparent by reference to the following description of one preferred embodiment of the invention taken in conjunction with the accompanying drawings.

Figure 4:
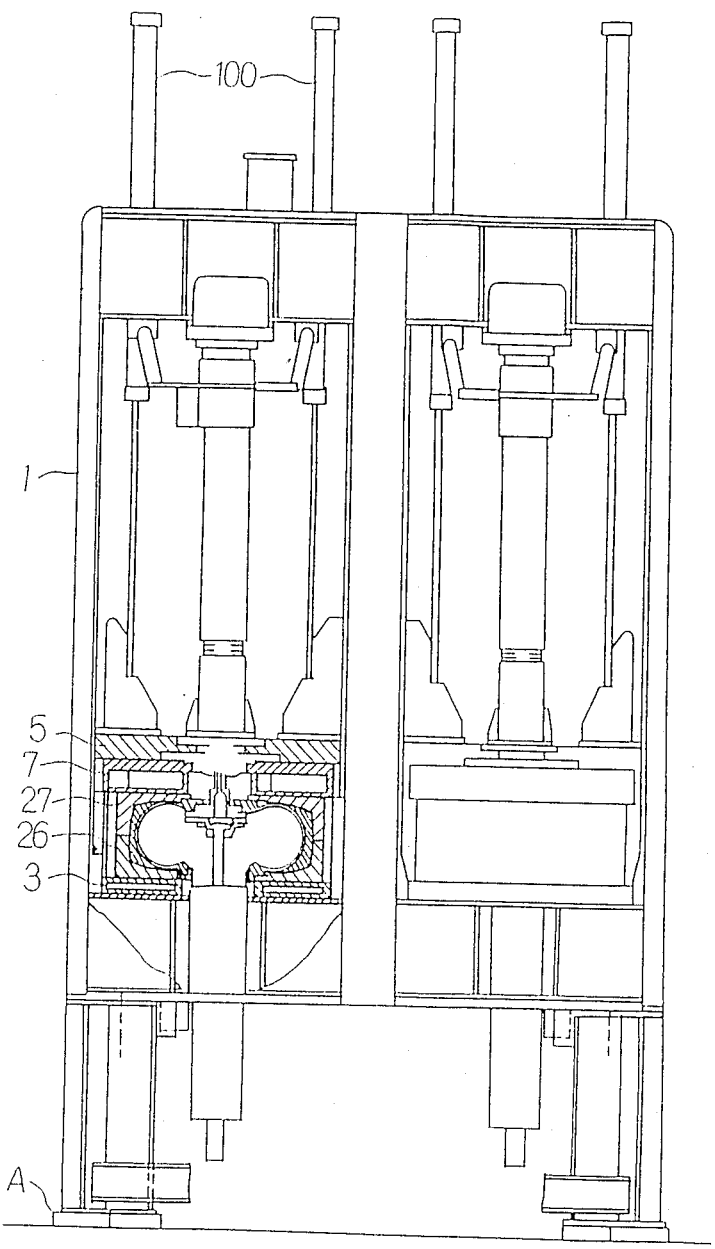
FIG. 4 is a general front view of a tire vulcanizing machine.

DESCRIPTION OF THE PREFERRED EMBODIMENT:

Referring now to FIG. 4 which shows a general construction of a tire vulcanizing machine, on installation bases A is installed a double-based frame 1, and in this frame are disposed two sets of vulcanizing apparatuses of the same shape. The vulcanizing apparatus includes upper and lower metal molds 26 and 27, the lower metal mold 26 being mounted to the frame 1 via a lower heat plate 3, and the upper metal mold 27 is mounted to a bolster plate 5 via an upper heat plate 7. It is to be noted that the bolster plate 5 is connected to elevator cylinders 100, so that the upper metal mold can be retreated upwards before and after a tire vulcanizing work.

In the following, one preferred embodiment of the present invention will be explained with reference to FIGS. 1 to 3. It is to be noted that in these figures, component parts designated by the same reference numerals as those in the heretofore known device described previously with reference to FIGS. 5 to 9 are identical or similar members to those included in the known device, and so, further description thereof will be omitted in part.

In these figures, reference numeral 5 designates a bolster plate, numeral 27 designates an upper metal mold, and numeral 7 designates an upper heat plate for heating the upper metal mold. Between the upper heat plate 7 and the bolster plate 5 is disposed a thermal insulator 6. Reference numeral 28 designates a clamp assistant plate fixedly secured to the upper metal mold 27, and a clamp slot 50 is drilled in this clamp assistant plate.

Reference numeral 9 designates clamp rods, which extends vertical as penetrating the upper heat plate 7, and each of which is supported by bearings 17 and 18 in a rotatable and vertically movable manner with respect to the bolster plate 5. Reference numeral 10 designates a clamp claw projected horizontally from the bottom end of the clamp rod 9, the plan configuration of the clamp claw 10 is similar to that of the heretofore known device shown in FIG. 8, and after it has been aligned with and inserted into the clamp slot 50, by rotating it by about 90°, the upper metal mold is clamped.

Reference numeral 15 designates a male screw threaded at a middle position of the clamp rod 9, which is threadedly engaged with a nut 16 disposed outside of the male screw 15, and so, when the clamp rod 9 is rotated, it serves to make the clamp rod 9 move upwards by the threads and to attract the upper metal mold 27 engaged with the clamp screw 10 towards the upper heat plate 7.

Reference numeral 51 designates a spring interposed between a flange portion 52 in the proximity of the bottom end of the clamp rod 9 and the bolster plate 5, which always biases the clamp rod 9 downwards, and which serves to allow the clamp rod 9 to escape upwards and to prevent the clamp claw 10 from damaging, by shrinking when an upward force exceeding a predetermined value is exerted upon the clamp rod 9. Reference numeral 53 designates a clamp claw retreating and accommodating space provided on the bottom surface of the upper heat plate 7.

Reference numeral 54 designates a support metal for the above-mentioned nut 16, which is fixedly secured to the upper surface of the bolster plate 5 by means of bolts 55, and which is held in contact with the outer periphey of the nut 16 via a hexagonal cross-section hole, and as a result, the support metal 54 restrains rotation of the nut 16 and allows only vertical movement of the same.

Reference numeral 13 designates a horizontal lever that is fixedly secured to the top end of the clamp rod 9 via a key 14.

Figure 3:
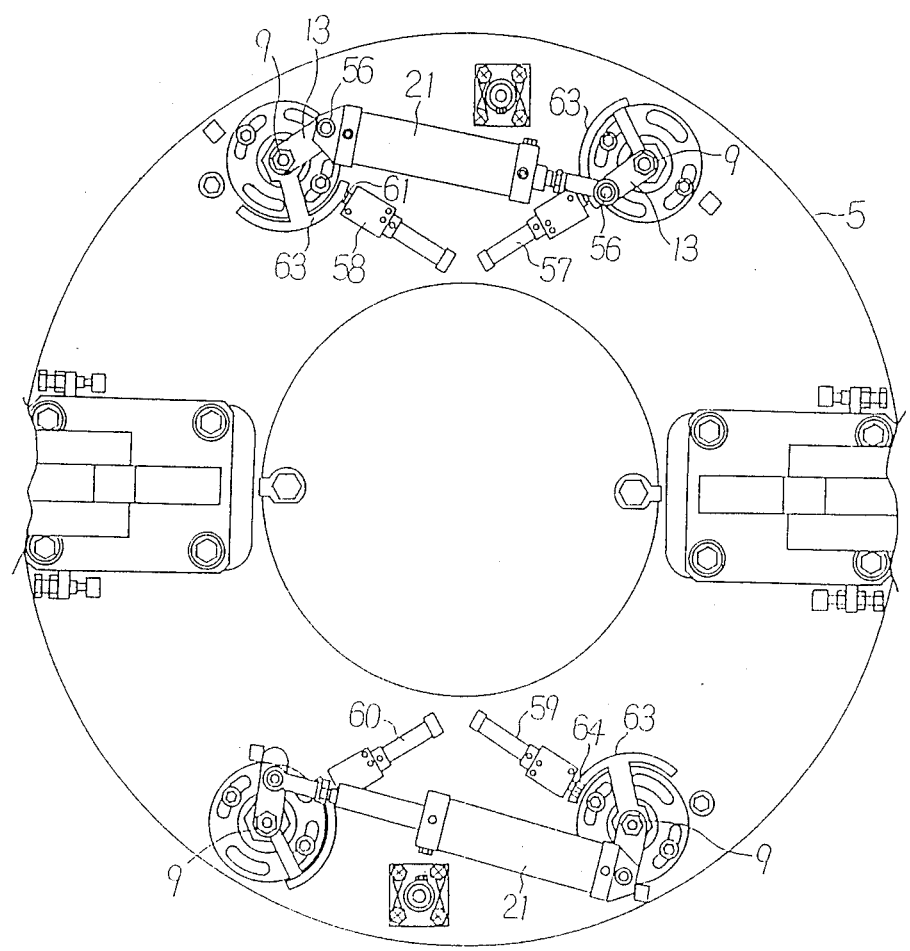
FIG. 3 is a general plan view of the upper metal mold clamp device shown in FIG. 1.

It is to be noted that the above-mentioned clamp rods 9 are disposed at four locations on a plane of the bolster plate 5, as shown in FIG. 3.

Reference numeral 21 designates a hydraulic cylinder having one end connected to the horizontal lever 13 of one clamp rod 9 via a pin 56 and the other end connected to the horizontal lever 13 of another clamp rod 9 via a pin 56, which applies torques to the above-mentioned cylinders 9 as a result of extension or contraction thereof. The other hydraulic cylinder 9 is also the same. In this connection, the hydraulic cylinder 21 shown at the above in FIG. 3 is illustrated in a state before the clamp rods 9 clamp the upper metal mold where the cylinder 21 is contracted, while the hydraulic cylinder 9 at the below is illustrated in a state where it is extended and the clamp rods 9 have clamped the upper metal mold.

Reference numerals 57, 58, 59 and 60 designate locking cylinders disposed on the bolster plate 5 in correspondence to the aforementioned four clamp rods 9. Each of these locking cylinders 57-60 consists of a lock pin 61 mounted to the tip end of a rod of the locking cylinder, a spring 62 always biasing the lock pin towards the clamp rod 9 and a pressurized fluid chamber 63 for retracting the lock pin upon unlocking. On the side of the clamp rod 9 is provided a lock pin receiving metal 64, and provision is made such that at the angular position where the clamp rod 9 has been rotated by a predetermined angle, a hole 64a formed in the lock pin receiving metal 64 may align in position with the lock pin 61.

A procedure of mounting a metal mold in the above-described apparatus will be explained in the following.

At first, the bolster plate 5, the thermal insulator 6 and the upper heat plate 7 are integrally raised up to an upper limit position, and thereby a space for carrying in a metal mold is kept broadened. Next, the upper and lower metal molds 26 and 27 and the clamp assistant plate 28 are made to sit at a regular position within the vulcanizing machine by means of a conveying instrument such as a fork-lift or the like. Then the bolster plate 5 is lowered, and the upper heat plate 7 and the clamp assistant plate 28 (that is, the upper metal mold 27) are brought into tight contact with each other. At this time, it is necessary that the clamp claw 10 aligns with the clamp slot 50 and is accommodated in the latter. If the alignment between the clamp claw 10 and the clamp slot 50 should fail and the clamp claw 10 should strike against the upper surface of the upper metal mold 27 (the clamp assistant plate 28), the spring 51 would shrink and the clamp rod 9 would retreat upward, so that the clamp claw 10 is pulled into the retreating and accommodating space 53 provided in the upper heat plate 7, and can be saved from damage. Accordingly, the bolster plate 5 is raised again, and after centering between the upper and lower metal molds 26 and 27 have been carried out, alignment between the clamp claw 10 and the clamp slot 50 is realized. If the alignment has been done successfully, after the lower metal mold 26 has been fixed to the lower heat plate 3 through the heretofore known method, a clamp work for the upper metal mold 27 is commenced. That is, compressed air or the like fed from a pressurized fluid source not shown is supplied to the hydraulic cylinders 21 to make them extend, and then the clamp rods 9 are rotated via the horizontal levers 13 connected to the opposite ends of the hydraulic cylinders 21, resulting in engagement of the clamp claws 10 with the clamp slots 50. At that time, the clamp rods 9 are raised due to threaded engagement between the male screw 15 and the nut 16, and the upper metal mold 27 is attracted towards the lower surface of the upper heat plate 7. When the clamp rods 9 have rotated by a predetermined amount (for instance, by 90°), the lock pins 61 of the locking cylinders 57-60 align with the holes 64a in the lock pin receiving metals 64, hence the lock pins 61 are inserted into the holes 64a by the resilient forces of the springs 62, and thus locking is effected.

As will be apparent from the detailed description of the preferred embodiment above, according to the present invention, owing to the fact that in an upper metal mold clamp device of a tire vulcanizing machine of the type that an upper metal mold is detachably fixed to a bolster plate by rotating a plurality of clamp rods penetrating vertically through the bolster plate and provided with clamp claws at their bottom ends, there are provided drive units for rotating the respective clamp rods independently of rotation of the other clamp rods, nuts mounted onto the bolster plate in an unrotatable but vertically movable manner and threadedly engaged with male screws at the upper portions of the clamp rods, and clamp claw accommodating spaces formed around the clamp rods on the bottom surface of an upper heat plate held in contact with the upper metal mold, the following advantages are obtained:

(1) Since rotation of each clamp rod is effected independently of rotation of the other clamp rods, even in the event that rotation of one clamp rod is insufficient, the other clamp rods can fully rotate respectively by 90°.

(2) Even in the case where the clamp claw could not be successfully inserted into the clamp slot in the upper metal mold upon exchange of the upper metal mold, the clamp claw would not be damaged because it is attracted into the clamp claw accommodating space.

(3) Owing to the fact that the lock pin is automatically actuated at the position where the clamp operation has finished, there is no risk that during a work, clamping may be loosened and the metal mold may fall.

(4) Therefore, according to the present invention, an upper metal mold clamp device in a tire vulcanizing machine which can perform an upper metal mold exchange work quickly, reliably and safely, can be realized.

Since many changes and modifications can be made to the above-described construction without departing from the spirit of the present invention, it is intended that all matter contained in the above description and illustrated in the accompanying drawings shall be interpreted to be illustrative and not in a limiting sense.

What is claimed is:

1. A tire vulcanizing apparatus, comprising: an upper mold clamp device, an upper metal mold detachably fixed to a bolster by rotating a plurality of clamp rods vertically penetrating through the bolster and provided with clamp claws at their bottom ends; said clamp device having drive units for rotating the respective clamp rods independently of rotation of the other clamp rods, nuts mounted onto the bolster plate in an unrotatable but vertically movable manner and threadably engaged with male screws at the upper portions of the clamp rods, the clamp claws occupying spaces formed around the clamp rods on the bottom surface of an upper heat plate held in contact with the upper metal mold.

2. An upper metal mold clamp device in a tire vulcanizing machine as claimed in claim 1 wherein a spring for urging a clamp rod downwards is interposed between each clamp rod and the bolster plate.

3. An upper meal mold clamp device in a tire volcanizing machine as claimed in claim 1 wherein said clamp device further includes clamp position locking means for the clamp rods.

4. An upper metal mold clamp device in a tire vulcanizing machine as claimed in claim 3, wherein a spring for urging a clamp rod downwards is interposed between each clamp rod and the bolster plate.

5. An upper metal mold clamp device in a tire vulcanizing machine as claimed in claim 1, wherein the drive unit for each clamp rod is a hydraulic cylinder.

6. An upper metal mold clamp device in a tire vulcanizing machine as claimed in claim 5, wherein a spring for urging a clamp rod downwards is interposed between each clamp rod and the bolster plate.

7. An upper metal mold clamp device in a tire vulcanizing machine as claimed in claim 5, wherein said clamp device further includes clamp position locking means for the clamp rods.

8. An upper metal mold clamp device in a tire vulcanizing machine as claimed in claim 7, wherein a spring for urging a clamp rod downwards is interposed between each clamp rod and the bolster plate.

* * * * *

UNITED STATES PATENT AND TRADEMARK OFFICE
CERTIFICATE OF CORRECTION

PATENT NO.   : 4,964,792

DATED        : October 23, 1990

INVENTOR(S)  : Hideaki KATAYAMA et al.

It is certified that error appears in the above-identified patent and that said Letters Patent is hereby corrected as shown below:

COLUMNS 1-7, ENDING WITH LINE 11 IN COLUMN 7
The specification has been replaced with the following:

--UPPER METAL MOLD CLAMP DEVICE IN
A TIRE VULCANIZING MACHINE

BACKGROUND OF THE INVENTION

Field of the Invention:

The present invention relates to a device for automatically mounting and dismounting an upper metal mold to and from a bolster plate and an upper heat plate upon an exchange of metal molds, to accommodate for a different size and kind of a tire to be vulcanized, in a tire vulcanizing machine.

Description of the Prior Art:

In a tire vulcanizing machine, metal molds for vulcanization respectively have different configurations for respective kinds and respective sizes of tires and depending upon a tire production schedule, it is necessary to exchange metal molds fairly frequently.

An upper metal mold and a lower metal mold were fixed to an upper heat plate and a lower heat plate, respectively, by fastening bolts in the prior art. Since the work associated with exchanging the molds takes a long period of time, in recent years plans for improvements thereof have been proposed. One of the proposals is the invention disclosed in Japanese Patent Application No. 60-037704 (1985), and this invention will be described with reference to Figs. 5 to 9.

UNITED STATES PATENT AND TRADEMARK OFFICE
CERTIFICATE OF CORRECTION

PATENT NO. : 4,964,792

DATED : October 23, 1990

INVENTOR(S) : Hideaki KATAYAMA et al.

It is certified that error appears in the above-identified patent and that said Letters Patent is hereby corrected as shown below:

In Figs. 5 to 9, a metal mold mount portion within a tire vulcanizing machine includes a thermal insulator 2 and a lower heat plate 3 fixedly fastened to a vulcanizing machine frame 1 by means of bolts 4.

With respect to an upper metal mold, a thermal insulator 6 and an upper heat plate 7 are fixedly fastened integrally to a lower surface of a bolster plate 5 by means of bolts 8. The bolster plate 5 is exactly raised and lowered within a frame by means of an elevator and guide means not shown.

Clamp rod 9 extends through holes in the bolster plate 5, the thermal insulator 6 and the upper heat plate 7. At the bottom end of the clamp rod 9 is formed a clamp claw 10, and its top end is fitted to a rotating lever 13 via a key 14. At the middle of a shaft of the clamp rod 9 is mounted a sprocket 11 via a key 12. Furthermore, on the middle portion of the clamp rod 9 is formed a male screw 15, and this male screw 15 is threadedly engaged with a nut 16 which is fixed to the bolster plate 5 by means of bolts 30. Bearings 17 and 18 support the clamp rod 9.

The clamp rods 9 are disposed at four locations at equal intervals about the bolster plate 5. The respective sprockets 11 are interlocked via a roller chain 19, whereby rotational drive for the clamp rods 9 is simultaneously transmitted to the clamp rods 9 at four locations.

Numeral 20 designates an idler sprocket for preventing the roller chain 19 from loosening.

Actuation of a cylinder 21 rotationally drives the clamp rod 9 via the lever 13 and the key 14.

UNITED STATES PATENT AND TRADEMARK OFFICE
CERTIFICATE OF CORRECTION

PATENT NO. : 4,964,792

DATED : October 23, 1990

INVENTOR(S) : Hideaki KATAYAMA et al.

It is certified that error appears in the above-identified patent and that said Letters Patent is hereby corrected as shown below:

A metal clamp 22, a link 23, a lever 24 and a cylinder 25 are used for clamping a lower metal mold 26 and a lower heat plate 3.

A clamp assistant plate 28 is fastened to a top surface of an upper metal mold 27 by means of bolts 29, and thus the upper metal mold 27 and the clamp assistant plate 28 are mounted in the vulcanizing machine in an integrated state.

When a metal mold is carried into a vulcanizing machine, at first the bolster plate 5, the thermal insulator 6 and the upper heat plate 7 are integrally raised up to an upper limit position to broaden a carry-in space for the metal mold. And then, the upper and lower metal molds 26 and 27 and the clamp assistant plate 28 are set at a regular position in the vulcanizing machine 3 by means of a conveying instrument such as a fork-lift or the like. Next, the bolster plate 5 is lowered to bring the upper heat plate 7 into tight contact with the clamp assistant plate 28. At this moment, the clamp claw 10 must be accommodated in the bore of the clamp assistant plate 28 at the position shown in Fig. 8. Then, by actuating the cylinder 25, the metal clamp 22 is engaged with mold 26 within a slot 31 in the lower metal mold 26, whereby the lower heat plate and the mold 26 are clamped together.

Figure 9:
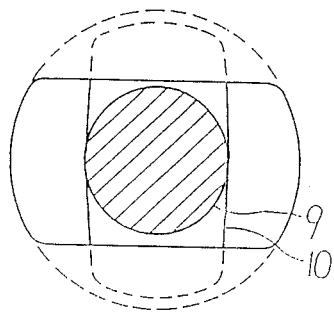
FIG. 9 is a similar cross-section view but showing a state where a clamp claw has been rotated by 90° with respect to the state shown in FIG. 8.

Subsequently, the cylinder 21 is actuated to rotate the clamp rod 9. Hence, the clamp claw 10 is rotated by about 90° as shown in Fig. 9, and the upper heat plate 7 and the clamp assistant plate 28 are clamped together. When the clamp rod 9 rotates, the clamp rod 9 is raised by the screw 15, and the upper heat plate 7 and the clamp assistant plate 28 are firmly held in tight contact.

However, the above-described upper metal mold clamp device had the following shortcomings.

UNITED STATES PATENT AND TRADEMARK OFFICE
CERTIFICATE OF CORRECTION

PATENT NO. : 4,964,792
DATED : October 23, 1990
INVENTOR(S) : Hideaki KATAYAMA et al.

It is certified that error appears in the above-identified patent and that said Letters Patent is hereby corrected as shown below:

(1) In the above-mentioned device, four clamp rods (screw rods) and claws are rotated via a chain by means of a single hydraulic cylinder whereby the upper metal mold is raised. Accordingly, the rotational angle and the raised height of the screw rods are constant for the four screw rods, and so, there is a shortcoming that if one of the four screw rods should unexpectedly complete its engagement with the upper metal mold prior to the others, then the remaining three would become unable to be raised further into engagement with the upper metal mold.

(2) In addition, there is a shortcoming in that if the clamp claw is not well inserted into the clamp bore of the clamp assistant plate and strikes against the top surface of the clamp assistant plate, the bolster plate and the like would exert a load on the clamp claw, and the claw would be damaged.

(3) Furthermore, there is a possibility that during a vulcanizing operation, the clamping of the upper metal mold may loosen and the upper metal mold may fall.

SUMMARY OF THE INVENTION

It is therefore one object of the present invention to provide an upper metal mold clamp device which is free from the above-described shortcomings (1) to (3) in the prior art, and which can quickly and reliably carry out the exchange of an upper metal mold.

According to one feature of the present invention, in a tire vulcanizing machine in which an upper metal mold is detachably fixed to a bolster by a plurality of clamp rods extending vertically through the bolster and provided with clamp claws at their bottom ends, there is provided a clamp device comprising

UNITED STATES PATENT AND TRADEMARK OFFICE
CERTIFICATE OF CORRECTION

PATENT NO. : 4,964,792

DATED : October 23, 1990

INVENTOR(S) : Hideaki KATAYAMA et al.

It is certified that error appears in the above-identified patent and that said Letters Patent is hereby corrected as shown below:

drive units such as hydraulic cylinders for rotating the respective clamp rods independently of one another, nuts mounted onto the bolster plate in a non-rotatable but vertically movable manner and threadedly engaged with male screws at the upper portions of the clamp rods, and clamp claw accommodating spaces formed around the clamp rods on the bottom surface of an upper heat plate held in contact with the upper metal mold.

According to a more specific feature of the present invention, the subject upper metal mold clamp device comprises a plurality of clamp rods extending vertically through a bolster plate and an upper heat plate, drive units such as hydraulic cylinders or the like connected to the top ends of the clamp rods via horizontal levers to apply torques to the clamp rods, clamp claws extending horizontally from the bottom ends of the clamp rods and adapted to be fitted in and disengaged from clamp slots in the upper metal mold, male screws threaded at mid-portions of the clamp rods, nuts threadedly engaged with the male screws and mounted onto the bolster plate in a non-rotatable but vertically movable manner, spaces machined in the upper heat plate for accommodating the clamp claws, and springs interposed between the clamp rods and the bolster plate for biasing the clamp rods downwards.

During operation of the metal mold clamp device according to the present invention, upper and lower metal molds are carried into a tire vulcanizing machine by means of a conveying instrument such as a fork-lift or the like, and are set at a regular position on a lower heat plate. Under this condition, the clamp claws are inserted into the clamp slots in the upper metal mold.

Subsequently, when the drive units for the clamp rods are actuated, for instance, by feeding pressurized fluid to hydraulic cylinders, the clamp rods are rotated and the clamp claws fit in

UNITED STATES PATENT AND TRADEMARK OFFICE
CERTIFICATE OF CORRECTION

PATENT NO. : 4,964,792
DATED : October 23, 1990
INVENTOR(S) : Hideaki KATAYAMA et al.

It is certified that error appears in the above-identified patent and that said Letters Patent is hereby corrected as shown below:

the clamp slots. In addition, during the rotation, the clamp rods move upwards as a result of the threaded engagement between the male screws and the female screws, and the upper metal mold is pulled towards the upper heat plate and is fastened thereto. When the clamp rod has rotated to a predetermined angular position, a lock pin operates to lock the clamp rod in position.

It is to be noted that during the lowering of the bolster plate, when the clamp claw is not aligned with the clamp slot in the upper metal mold but strikes against the top surface of the metal mold, the spring biasing the clamp rod downwards compresses and the clamp rod is pushed up, so that the clamp claw is drawn into the clamp claw accommodating space provided in the upper heat plate. As a result, damage to the clamp claw can be prevented. It is also to be noted that in association with the upward movement of the clamp rod, the male screw member and the drive unit for the clamp rod are also raised jointly.

The above-mentioned and other objects, features and advantages of the present invention will become more apparent by referring to the following description of one preferred embodiment of the invention taken in conjunction with the accompanying drawings.

BRIEF DESCRIPTION OF THE DRAWINGS

Figure 1:
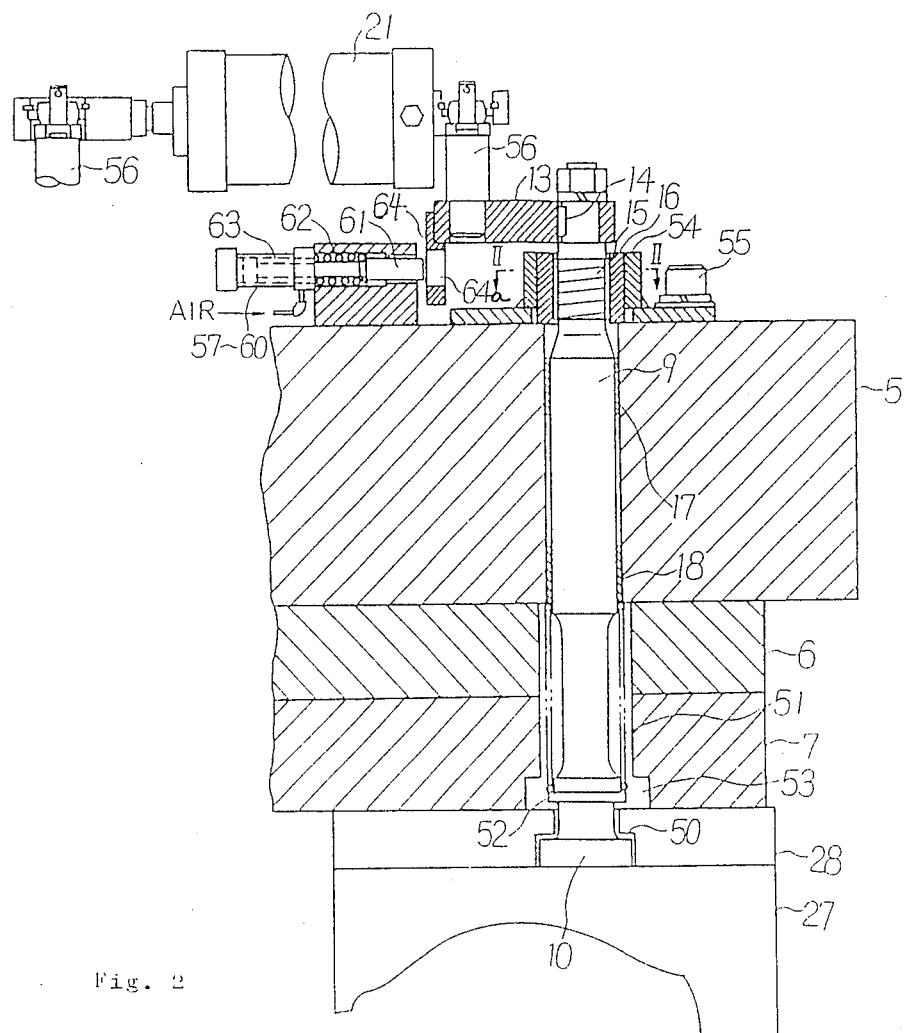
FIG. 1 is a vertical cross-section view of an essential part of an upper metal mold clamp device in a tire vulcanizing machine according to one preferred embodiment of the present invention.

In the accompanying drawings:

Fig. 1 is a vertical cross-sectional view of an essential part of an upper metal mold clamp device in a tire vulcanizing machine according to one preferred embodiment of the present invention;

UNITED STATES PATENT AND TRADEMARK OFFICE
CERTIFICATE OF CORRECTION

PATENT NO. : 4,964,792

DATED : October 23, 1990

INVENTOR(S) : Hideaki KATAYAMA et al.

Figure 2:
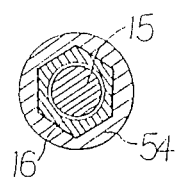
FIG. 2 is a partial horizontal cross-section view taken along line II—II in FIG. 1, as viewed in the direction of arrows.
Figure 5:
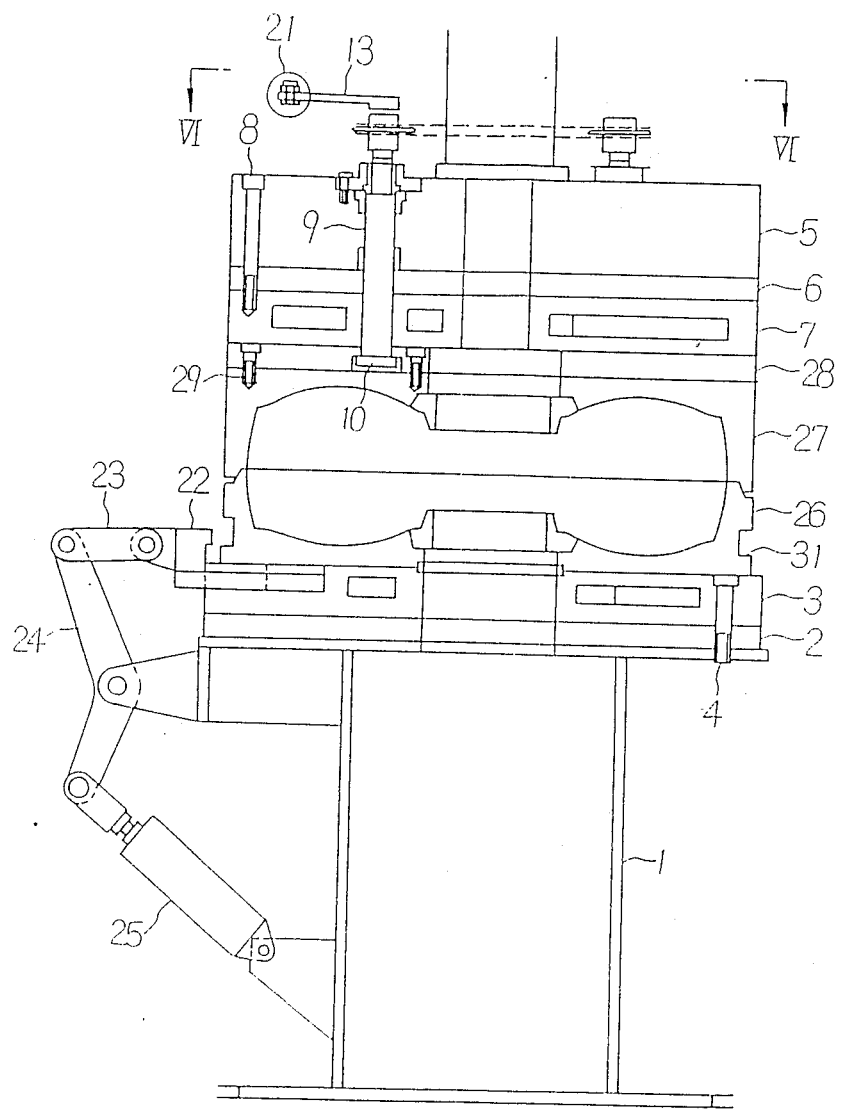
FIG. 5 is a schematic vertical cross-section view showing a metal mold clamp device in a tire vulcanizing machine in the prior art.
Figure 6:
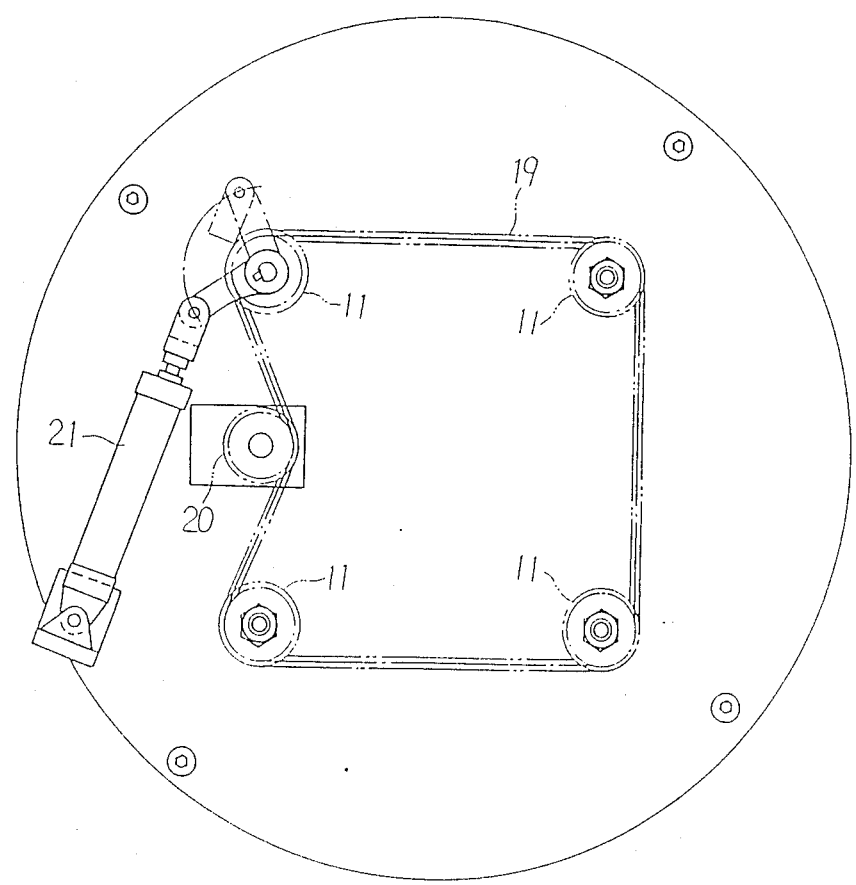
FIG. 6 is a plan view of the same device taken along line VI—VI in FIG. 5, as viewed in the direction of arrows.
Figure 7:
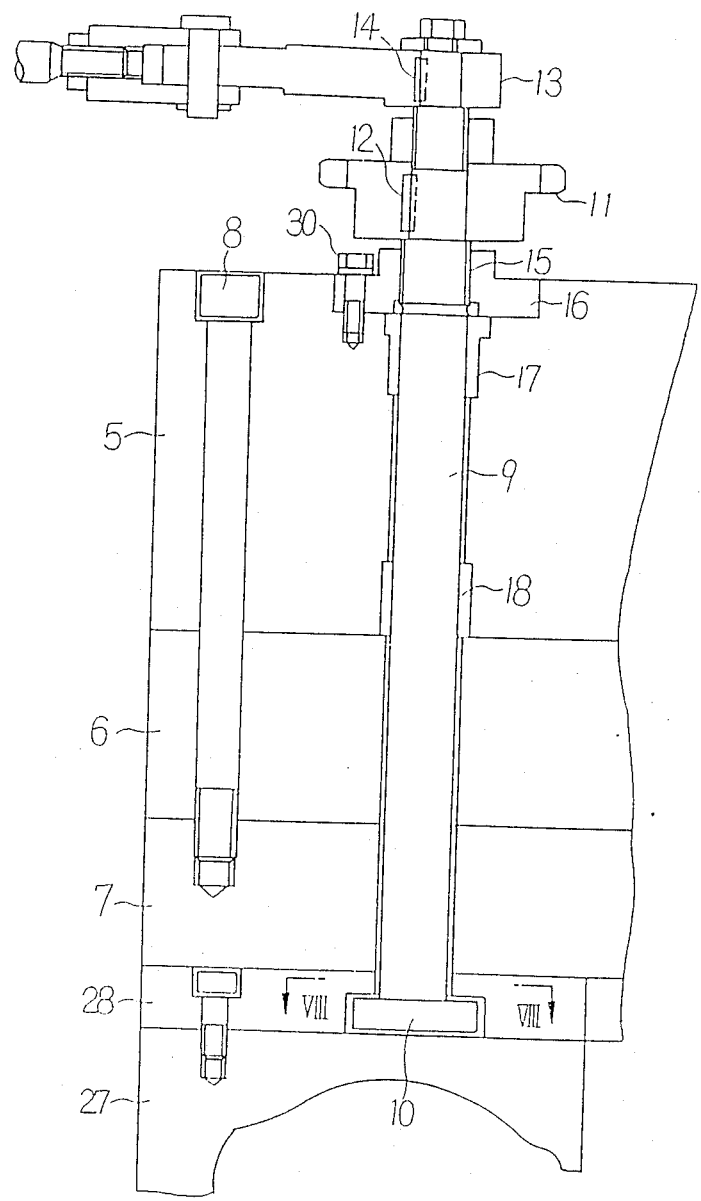
FIG. 7 is a schematic vertical cross-section view of the same device taken along a center axis of a clamp rod.
Figure 8:
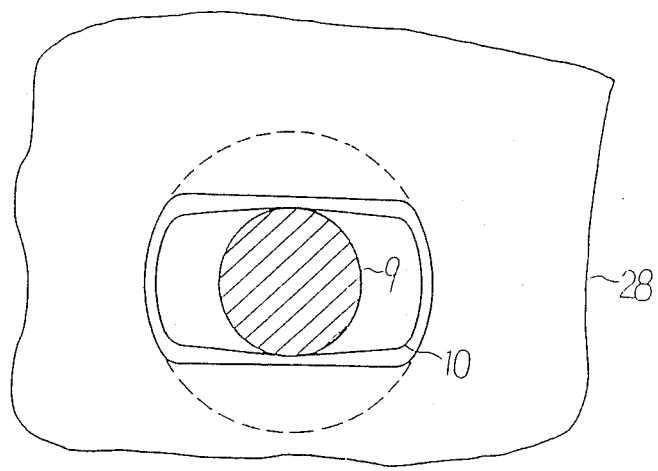
FIG. 8 is a partial horizontal cross-section view taken along line VIII—VIII in FIG. 7, as viewed in the direction of arrows.

It is certified that error appears in the above-identified patent and that said Letters Patent is hereby corrected as shown below:

Fig. 2 is a partial horizontal cross-sectional view taken along line II-II in Fig. 1;

Fig. 3 is a general plan view of the upper metal mold clamp device shown in Fig. 1;

Fig. 4 is a front view, partly in section, of a tire vulcanizing machine;

Fig. 5 is a schematic vertical cross-sectional view of a metal mold clamp device in a tire vulcanizing machine in the prior art;

Fig. 6 is a plan view of the same device taken along line VI-VI in Fig. 5;

Fig. 7 is a schematic vertical cross-sectional view of the same device taken along a center axis of a clamp rod;

Fig. 8 is a horizontal cross-sectional view taken along line VIII-VIIII in Fig. 7; and Fig. 9 is a similar cross-sectional view but showing a state in which a clamp claw has been rotated by 90° with respect to the state shown in Fig. 8.

DETAILED DESCRIPTION OF THE PREFERRED EMBODIMENT

Referring now to Fig. 4 which shows the general structure of a tire vulcanizing machine, on installation bases A is installed a double-based frame 1, and in this frame are disposed two sets of vulcanizing apparatuses of the same shape. Each vulcanizing apparatus includes upper and lower metal molds 26 and 27. The

UNITED STATES PATENT AND TRADEMARK OFFICE
CERTIFICATE OF CORRECTION

PATENT NO. : 4,964,792

DATED : October 23, 1990

INVENTOR(S) : Hideaki KATAYAMA et al.

It is certified that error appears in the above-identified patent and that said Letters Patent is hereby corrected as shown below:

lower metal mold 26 is mounted to the frame 1 via a lower heat plate 3, and the upper metal mold 27 is mounted to a bolster plate 5 via an upper heat plate 7. It is to be noted that the bolster plate 5 is connected to elevator cylinders 100, so that the upper metal mold can be retracted upwards before and after a tire vulcanizing operation.

In the following, one preferred embodiment of the present invention will be explained with reference to Figs. 1 to 3. It is to be noted that in these figures, component parts designated by the same reference numerals as those employed in Figs. 5 to 9 are identical or similar members to those in the known device, and so, a detailed description thereof will be omitted.

In these figures, reference numeral 5 designates a bolster plate, numeral 27 designates an upper metal mold, and numeral 7 designates an upper heat plate for heating the upper metal mold. Between the upper heat plate 7 and the bolster plate 5 is disposed a thermal insulator 6. Reference numeral 28 designates a clamp assistant plate fixedly secured to the upper metal mold 27, and a clamp slot 50 is drilled in this clamp assistant plate.

Reference numeral 9 designates clamp rods, which extend vertically through the upper heat plate 7, and each of which is supported by bearings 17 and 18 in a rotatable and vertically movable manner with respect to the bolster plate 5. Reference numeral 10 designates a clamp claw extending horizontally at the bottom end of the clamp rod 9. The plan configuration of the clamp claw 10 is similar to that of the heretofore known device shown in Fig. 8, and after it has been aligned with and inserted into the clamp slot 50, by rotating it by about 90°, the upper metal mold is clamped.

UNITED STATES PATENT AND TRADEMARK OFFICE
CERTIFICATE OF CORRECTION

PATENT NO. : 4,964,792

DATED : October 23, 1990

INVENTOR(S) : Hideaki KATAYAMA et al.

It is certified that error appears in the above-identified patent and that said Letters Patent is hereby corrected as shown below:

Reference numeral 15 designates a male screw thread at a middle portion of the clamp rod 9, which is threadedly engaged with a nut 16 disposed to the outside of the male screw 15. When the clamp rod 9 is rotated, the clamp rod 9 moves upwards by the threads to lift the upper metal mold 27 engaged with the clamp screw 10 towards the upper heat plate 7.

Reference number 51 designates a spring interposed between a flange portion 52, in the proximity of the bottom end of the clamp rod 9, and the bolster plate 5. Spring 51 always biases the clamp rod 9 downwards, and serves to allow the clamp rod 9 to move upwards and to prevent the clamp claw 10 from being damaged, by compressing when an upward force exceeding a predetermined value is exerted upon the clamp rod 9. Reference numeral 53 designates a clamp claw accommodating space provided on the bottom surface of the upper heat plate 7.

Reference numeral 54 designates a metal support for the above-mentioned nut 16, which is fixedly secured to the upper surface of the bolster plate 5 by means of bolts 55, and which is held in contact with the outer periphery of the nut 16 via a hole having a hexagonal cross section. The metal support 54 restrains rotation of the nut 16 and allows only vertical movement of the same.

Reference numeral 13 designates a horizontal lever that is fixedly secured to the top end of the clamp rod 9 via a key 14.

It is to be noted that the above-mentioned clamp rods 9 are disposed at four locations on a plane passing through the top of the bolster plate 5, as shown in Fig. 3.

UNITED STATES PATENT AND TRADEMARK OFFICE
CERTIFICATE OF CORRECTION

PATENT NO. : 4,964,792

DATED : October 23, 1990

INVENTOR(S) : Hideaki KATAYAMA et al.

It is certified that error appears in the above-identified patent and that said Letters Patent is hereby corrected as shown below:

Reference numeral 21 designates a hydraulic cylinder having one end connected to the horizontal lever 13 of one clamp rod 9 via a pin 56 and another end connected to the horizontal lever 13 of another clamp rod 9 via a pin 56. The cylinder 21 applies torques to the above-mentioned cylinders 9 as a result of the extension or retraction thereof. The other hydraulic cylinder 21 is the same. In this connection, the hydraulic cylinder 21 shown at the top of Fig. 3 is illustrated in a retracted state before the clamp rods 9 clamp the upper metal mold, while the hydraulic cylinder 9 at the bottom of Fig. 3 is illustrated in an extended state in which the clamp rods 9 associated therewith have clamped the upper metal mold.

Reference numerals 57, 58, 59 and 60 designate locking cylinders disposed on the bolster plate 5 in correspondence with the aforementioned four clamp rods 9. Each of these locking cylinders 57-60 consists of a lock pin 61 mounted to the tip end of a rod of the locking cylinder, a spring 62 always biasing the lock pin towards the clamp rod 9 and a pressurized fluid chamber 63 for retracting the lock pin. To the side of the clamp rod 9 is provided a lock pin receiving metal fixture 64. When the clamp rod 9 has been rotated by a predetermined angle, a hole 64a formed in the lock pin receiving metal fixture 64 is aligned with the lock pin 61.

A procedure of mounting a metal mold in the above-described apparatus will now be explained.

At first, the bolster plate 5, the thermal insulator 6 and the upper heat plate 7 are integrally raised to an upper limit position, whereby a space into which a metal mold is carried is provided. Next, the upper and lower metal molds 26 and 27 and the clamp assistant plate 28 are set at a regular position within the

UNITED STATES PATENT AND TRADEMARK OFFICE
CERTIFICATE OF CORRECTION

PATENT NO. : 4,964,792
DATED : October 23, 1990
INVENTOR(S) : Hideaki KATAYAMA et al.

It is certified that error appears in the above-identified patent and that said Letters Patent is hereby corrected as shown below:

vulcanizing machine by means of a conveying instrument such as a fork-lift or the like. Then the bolster plate 5 is lowered, and the upper heat plate 7 and the clamp assistant plate 28 (that is, the upper metal mold 27) are brought into tight contact with each other. At this time, it is necessary for the clamp claw 10 to be aligned with the clamp slot 50 and accommodated in the latter. If the alignment between the clamp claw 10 and the clamp slot 50 is not carried out and the clamp claw 10 strikes against the upper surface of the upper metal mold 27 (clamp assistant plate 28), the spring 51 compresses and the clamp rod 9 is moved upward, so that the clamp claw 10 is pulled into the retreating and accommodating space 53 provided in the upper heat plate 7, and can be prevented from being damaged. Accordingly, the bolster plate 5 is raised again, and after the upper and lower metal molds 26 and 27 have been centered, the clamp claw 10 and the clamp slot 50 are aligned. If the alignment has been done successfully, after the lower metal mold 26 has been fixed to the lower heat plate 3 through the heretofore known method, the upper metal mold 27 is clamped. That is, compressed air or the like fed from a pressurized fluid source (not shown) is supplied to extend the hydraulic cylinders 21, and then the clamp rods 9 are rotated via the horizontal levers 13 connected to the opposite ends of the hydraulic cylinders 21, resulting in the engagement of the clamp claws 10 with the upper mold 27 within the clamp slots 50. At that time, the clamp rods 9 are raised due to the threaded engagement between the male screw 15 and the nut 16, and the upper metal mold 27 is pulled towards the lower surface of the upper heat plate 7. When the clamp rods 9 have rotated by a predetermined amount (for instance, by 90°), the lock pins 61 of the locking cylinders 57 - 60 align with the holes 64a in the lock pin receiving metal fixtures 64. Hence, the lock pins 61 are inserted into the holes 64a by the resilient forces of the spring 62, and thus locking is effected.

UNITED STATES PATENT AND TRADEMARK OFFICE
CERTIFICATE OF CORRECTION

PATENT NO. : 4,964,792

DATED : October 23, 1990

INVENTOR(S) : Hideaki KATAYAMA et al.

It is certified that error appears in the above-identified patent and that said Letters Patent is hereby corrected as shown below:

As will be apparent from the detailed description of the preferred embodiment above, according to the present invention, owing to the fact that in a tire vulcanizing machine of the type in which an upper metal mold is detachably fixed to a bolster plate by a plurality of clamp rods extending vertically through the bolster plate and provided with clamp claws at their bottom ends, there are provided drive units for rotating the respective clamp rods independently, nuts mounted onto the bolster plate in a non-rotatable but vertically movable manner and threadedly engaged with male screws at the upper portions of the clamp rods, and clamp claw accommodating spaces formed around the clamp rods on the bottom surface of an upper heat plate held in contact with the upper metal mold, the following advantages are obtained.

(1) Since the rotation of each clamp rod is effected independently of rotation of the other clamp rods, even in the event that rotation of one clamp rod is insufficient, the other clamp rods can fully rotate respectively by 90°.

(2) Even in the case where the clamp claw could not be successfully inserted into the clamp slot in the upper metal mold during an exchange of the upper metal mold, the clamp claw would not be damaged because it is accommodated in the clamp claw accommodating space.

(3) Owing to the fact that the lock pin is automatically actuated when the clamp operation has finished, there is no risk of the clamping of the upper metal mold loosening and the metal mold falling during operation.

(4) Therefore, according to the present invention, an upper metal mold clamp device in a tire vulcanizing machine which can perform an upper metal mold exchange operation quickly, reliably and safely, can be realized.

UNITED STATES PATENT AND TRADEMARK OFFICE
CERTIFICATE OF CORRECTION

PATENT NO. : 4,964,792

DATED : October 23, 1990

INVENTOR(S) : Hideaki KATAYAMA et al.

It is certified that error appears in the above-identified patent and that said Letters Patent is hereby corrected as shown below:

Since many changes and modifications can be made to the above-described structure without departing from the spirit of the present invention, it is intended that all matter contained in the above description and illustrated in the accompanying drawings shall be interpreted to be illustrative of the present invention and not in a limiting sense with respect thereto.--

Signed and Sealed this

Sixth Day of October, 1992

Attest:

DOUGLAS B. COMER

Attesting Officer

Acting Commissioner of Patents and Trademarks